United States Patent [19]
Ariki

[11] Patent Number: 5,787,797
[45] Date of Patent: Aug. 4, 1998

[54] TEAPOT

[76] Inventor: Seio Ariki, 2891-1, Oaza Ushirokawauchi, Takaharu-cho, Nishimorokata-gun, Miyazaki, 889-44, Japan

[21] Appl. No.: 716,342

[22] PCT Filed: Mar. 29, 1995

[86] PCT No.: PCT/JP95/00608
§ 371 Date: Dec. 4, 1996
§ 102(e) Date: Dec. 4, 1996

[87] PCT Pub. No.: WO95/26667
PCT Pub. Date: Oct. 12, 1995

[30] Foreign Application Priority Data

Apr. 2, 1994 [JP] Japan .................... 6-099045

[51] Int. Cl.[6] .................... A47J 31/00; A23F 3/00
[52] U.S. Cl. .................... 99/323; 99/323.3; 220/374
[58] Field of Search .................... 99/323, 323.3; 220/367.1, 373, 374

[56] References Cited

U.S. PATENT DOCUMENTS

| | | | |
|---|---|---|---|
| 2,686,597 | 8/1954 | Lilja | 99/323 X |
| 4,858,787 | 8/1989 | Stone | 220/374 X |
| 5,609,194 | 3/1997 | Link et al. | 220/367.1 |

FOREIGN PATENT DOCUMENTS 0006701 of 1902 United Kingdom.

*Primary Examiner*—Reginald L. Alexander
*Attorney, Agent, or Firm*—Sheridan Ross P.C.

[57] ABSTRACT

A teapot into which the air can be efficiently sucked through a suction port to efficiently agitate tea form brewing and which can prevent clogging of filtering holes. A suction port 20 is formed on a lid 2 and close to a knob 24. A vent hole 21 is provided in the bottom surface of the lid 2, which communicates with the suction port 20 and of which a blow-out port 22 is adjacent to an outer bottom surface 26. Air is sucked from the suction port 20 into a teapot body 1 through the vent hole 21 to agitate hot water 52.

4 Claims, 7 Drawing Sheets

TEAPOT

TECHNICAL FIELD

This invention relates to a teapot used for brewing tea and herbs.

BACKGROUND OF THE INVENTION

As shown in the FIG. 9, a teapot of the prior art comprises a teapot body 6 having a top-mouth 61 and lid 62 closing the top-mouth 61. A suction port 63 is excavated on the lid 62 adjacement to its periphery. The suction port 63 is spaced some distance from the center of the lid 62.

As shown in the FIG. 10, the diameter of the lid 62 is less than the inside diameter of the top-mouth 61 of the teapot body 6. Thus, the lid 62 is just mounted on the top-mouth 61.

As shown in the FIG. 11, the tea 5 often spills out from the suction port 63 when the tea 5 is poured out from the outlet 64.

Consequently, air can not be efficiently sucked from the suction port 63, hot water cannot be agitated in the teapot body 6 adequately, and the filtering holes 65 of the outlet 64 are apt to be clogged by tea leaves.

Accordingly, it is an object of the present invention to provide a teapot into which air can be efficiently sucked through a suction port to efficiently agitate tea for brewing and which can prevent clogging of filtering holes by the tea leaves.

SUMMARY OF THE INVENTION

To accomplish the foregoing objects, the present invention comprises; a teapot body having a top-mouth at the top thereof and a outlet on the side wall thereof, and a lid 2 which covers said top-mouth, characterized in that a suction port is formed adjacent to the center of said lid, a vent hole is provided from the center toward the periphery of said lid, and said vent hole communicates with said suction port.

BEST MODE OF CARRYING OUT THE INVENTION

An embodiment of the present invention is described by referring the drawings.

Embodiment 1

Figure 1:
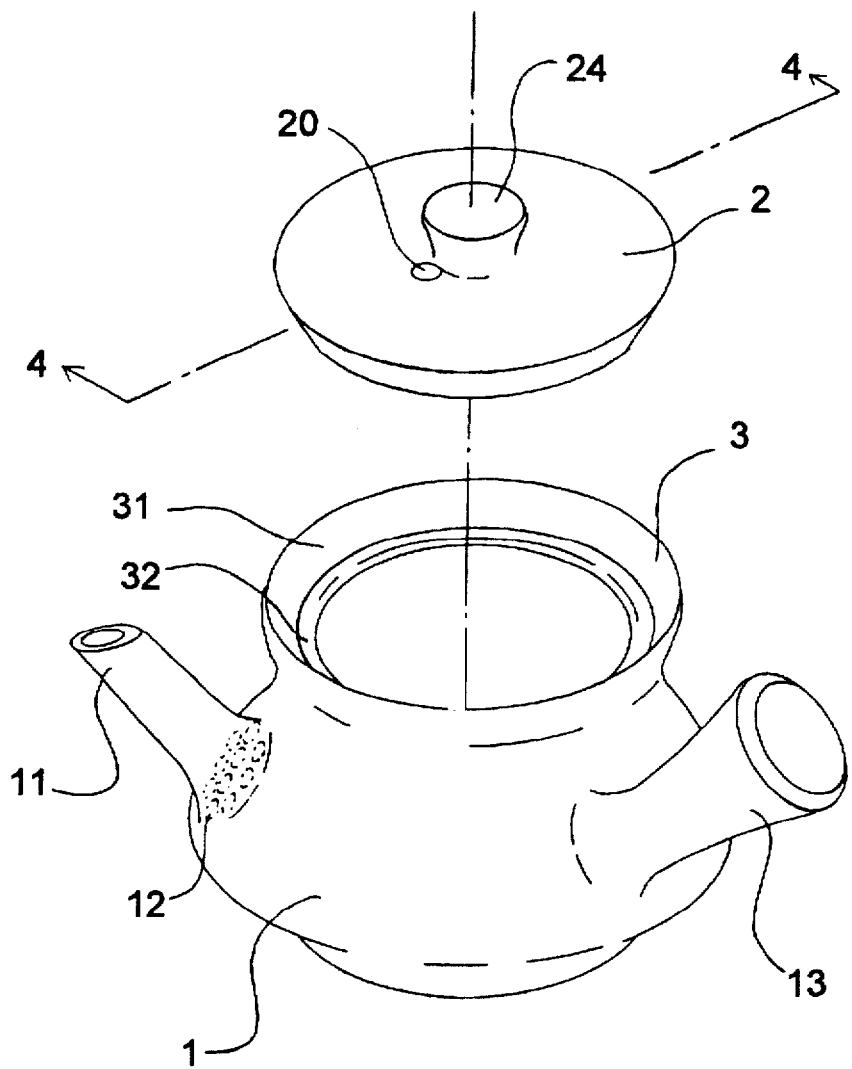
FIG. 1 is an exploded perspective illustration of a teapot of the first embodiment.

As shown in FIG. 1, the pot of the present embodiment comprises a teapot body 1 and a lid 2. The teapot body 1 has a top-mouth 3 at its top, and an outlet 11 and a handle 13 on the its side wall. The lid 2 covers the top-mouth 3.

Figure 2:
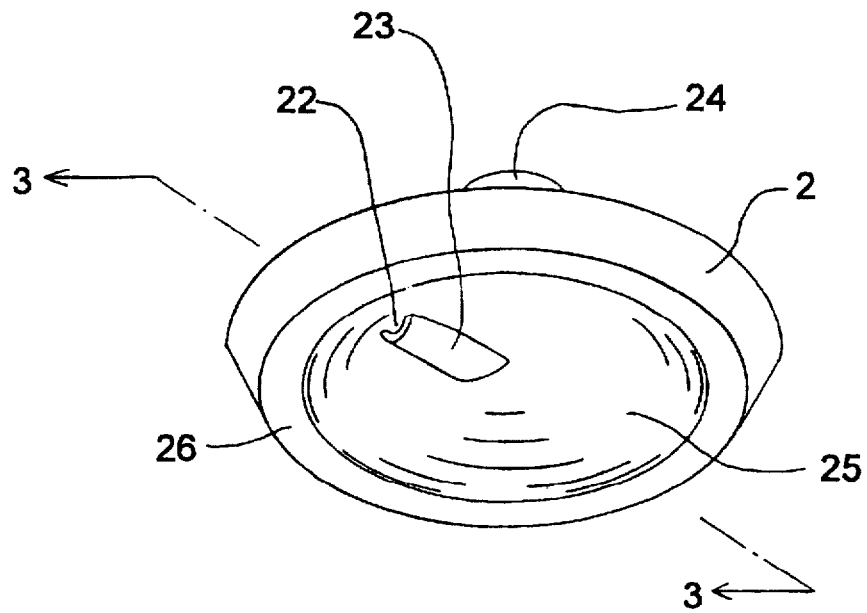
FIG. 2 is a perspective bottom view of a lid of the first embodiment.
Figure 3:
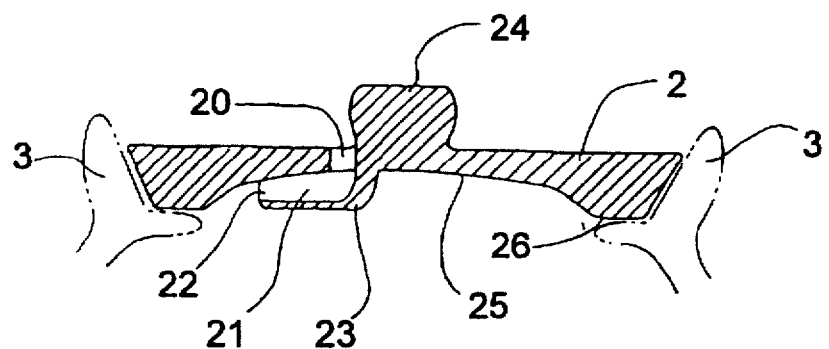
FIG. 3 is a cross section taken on line A—A in FIG. 2.

As shown in FIG. 2 and FIG. 3, the lid 2 has a knob 24 on the center thereof, in order to pick the lid 2 up. A suction port 20 is excavated adjacent to the knob 24. A vent hole 21 is provided in the bottom surface of the lid 2, which communicates with the suction port 20.

The vent hole 21 is formed by a half-tube wall 23 from the center toward the outside of the inner bottom surface 25. The vent hole 21 is connected to the suction port 20 and its inside end is blocked. The outside end of the vent hole 21 is opening as a blow-out port 22. The blow-out port 22 is adjacent to the periphery of the lid 2.

The bottom surface of the lid 2 comprises the inner bottom surface 25 and the outer bottom surface 26. The inner bottom surface 25 is formed declining from the center to the outer bottom surface 26, in the manner that the thickness of the lid 2 gradually increases. Therefore, the inner bottom surface 25 is downward curved in substance. And the outer bottom surface 26 is formed mono-thickness. The blow-out port 22 of the vent hole 21 is adjacent to the inside of the outer bottom surface 26.

As shown in FIG. 1, a stopper ring 32 is provided at the inside of the top-mouth 3, on which the lid 2 is put, and its upper surface is flattened so as to be shaped almost the same as the outer bottom surface 26.

The outlet 11 is protruding on the side-wall of the teapot body 1 and is upwardly inclining. The outlet 11 is pipe shaped, and a plurality of filtering holes 12 are excavated on the side-wall of the teapot body 1 where the outlet 11 is joined with the tea body 1 in order to filter off the tea leaves.

The handle 13 is disposed on the side-wall of the teapot body 1, and is at a 90 degree angle relative to the outlet 11. The handle 13 is inclining like the outlet 11.

The function of the present embodiment is hereby described.

Tea leaves 51 and hot water 52 are supplied into the teapot body 1 from the top-mouth 3. Then the top-mouth 3 is covered by the lid 2, in the manner that the blow-out port 22 of the vent hole 21 faces toward the outlet 11.

The handle 13 is held by a right hand. A top of the knob 24 is pressed by the thumb, and then the outer bottom surface 26 clings on the stopper ring 32. Thus, the top-mouth 3 is tightly covered by the lid 2.

Figure 4:
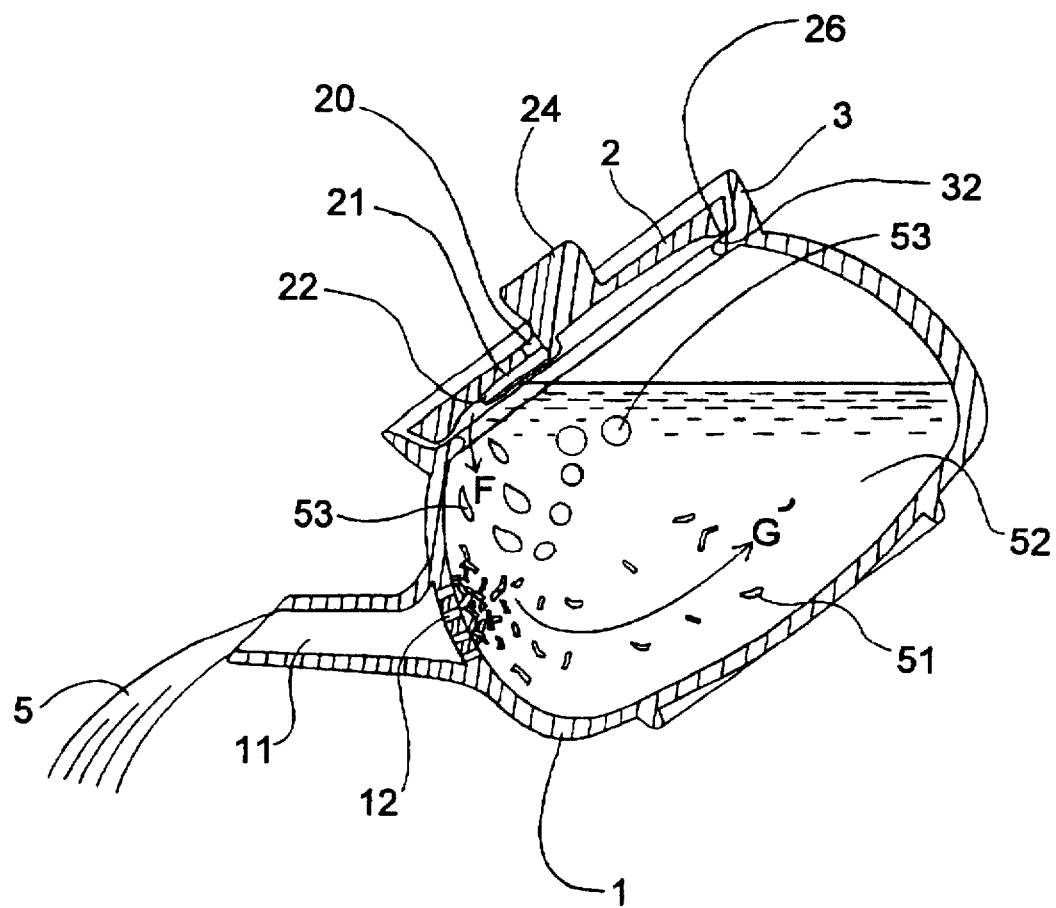
FIG. 4 is a sectional view taken on line B—B in FIG. 1, which is explaining the use of the teapot.

As shown in FIG. 4, the teapot body 1 is tilted in order to pour the tea 5 from the outlet 11. The surface of the hot water 52 rises up to the blow-out port 22, and then the blow-out port 22 is blocked by the hot water 52. The tea 5 shall never be spilled out from the suction port 20 because the suction port 20 positions above the surface of the hot water 52.

Pouring out the tea 5 from the outlet 11, the inside pressure of the teapot body 1 becomes negative against the outside pressure because the teapot body 1 is closed tightly by the lid 2. Air is efficiently sucked into the teapot body 1 from the blow-out port 22, passing through the vent hole 21 and the suction port 20. The direction of sucked air is changed by the inclination of the inner bottom surface 25 of the lid 2, and then the air is blown into the hot water 52 in the direction of Arrow F.

Water current G is generated by the air in the hot water 52, and the tea leaves 51, which tend to gather around filtering holes 12, are agitated thereby. Accordingly, the tea 5 is efficiently brewed, and the filtering holes 12 are prevented from clogging by the tea leaves 51.

Embodiment 2

Figure 5:
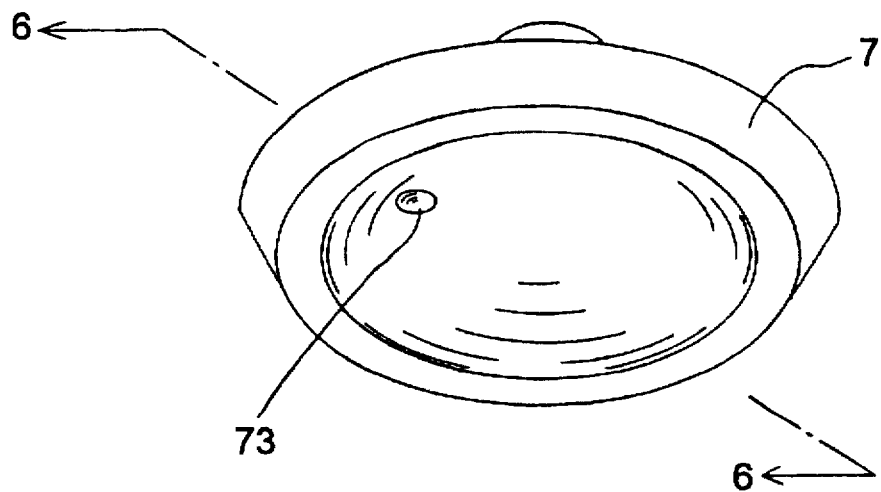
FIG. 5 is a perspective bottom view of a lid of the second embodiment.
Figure 6:
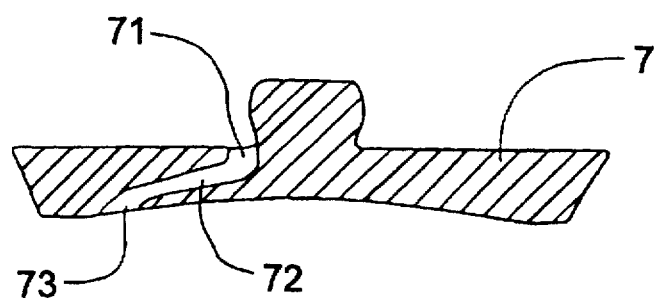
FIG. 6 is a sectional view taken on line C—C of FIG. 5.

The vent hole 21 of the embodiment 1 is formed by the half-tube wall 23. As shown in FIG. 6, a vent hole 72 of the embodiment 2 is excavated through inside of the lid 7. As shown in FIG. 5 and FIG. 6, a suction port 71 is provided in the upper surface of the lid 7, the blow-out port 73 is formed in the bottom surface of the lid 7, and the suction port 71, the vent hole 72 and the blow-out port 73 are communicated together.

The air is sucked from suction port 71 into a teapot body as well as the Embodiment 1, and tea is efficiently agitated in the teapot body.

Embodiment 3

Figure 7:
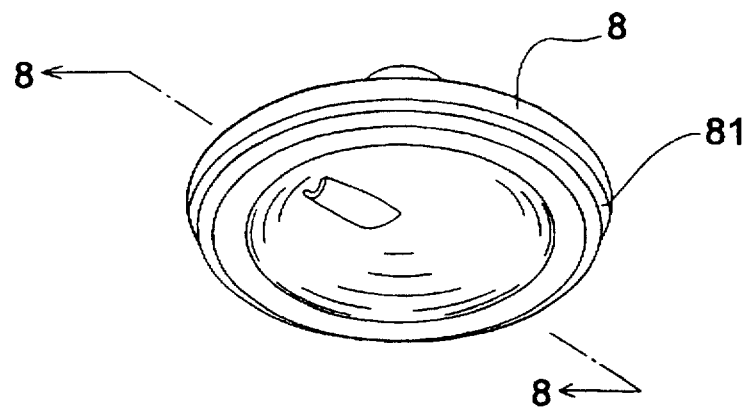
FIG. 7 is a perspective bottom view of a lid of the third embodiment.
Figure 8:
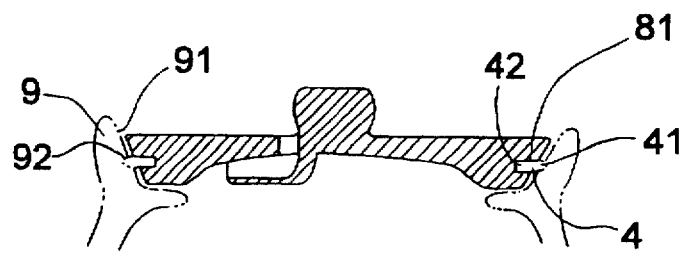
FIG. 8 is a sectional view taken on line D—D of FIG. 7.
Figure 9:
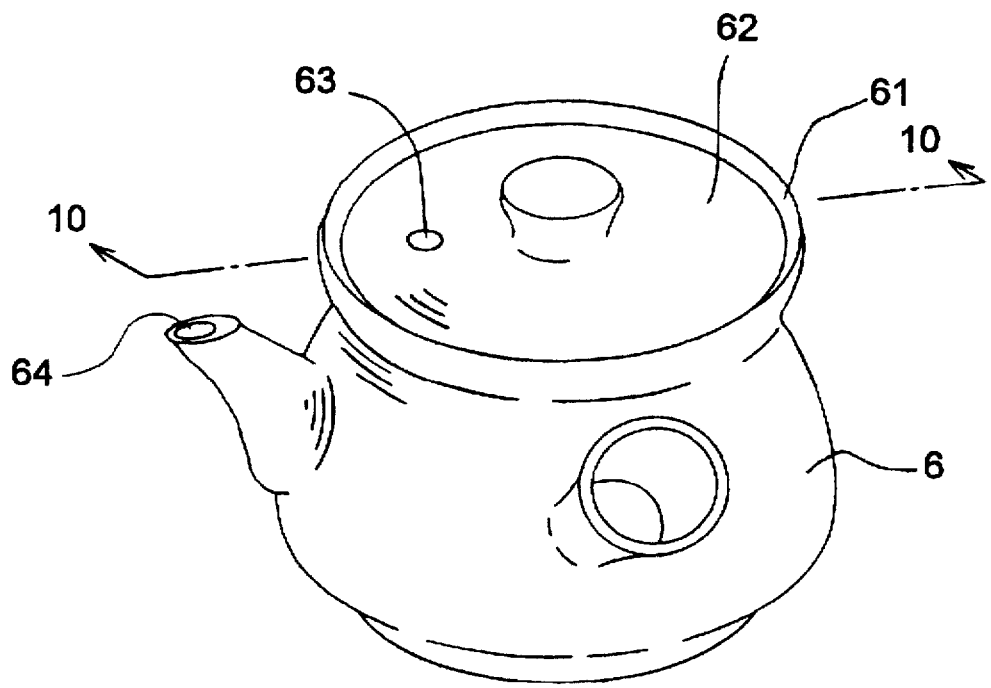
FIG. 9 is a perspective view of a teapot of the prior art.
Figure 10:
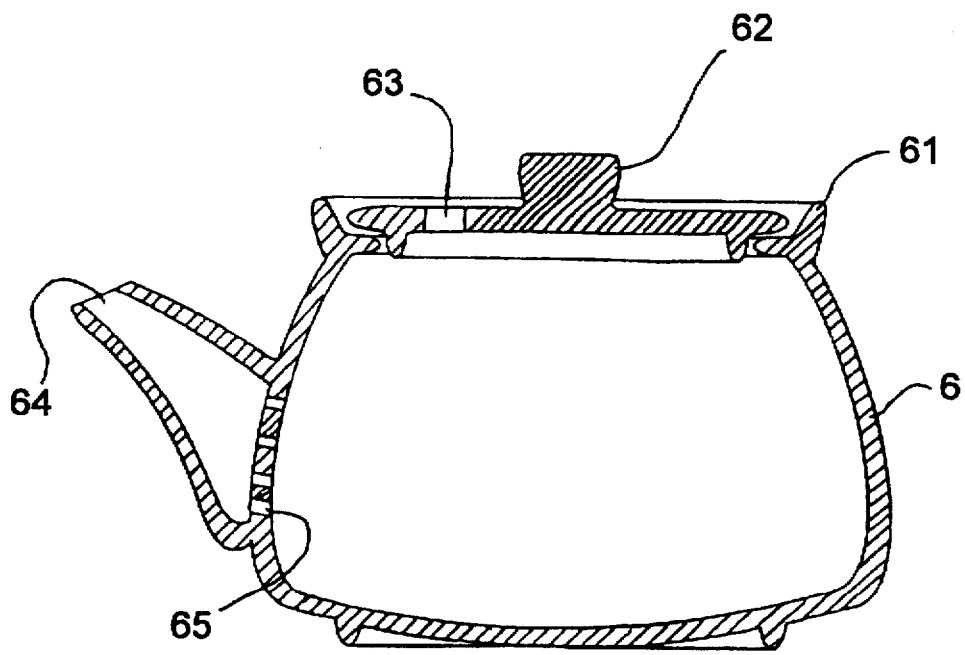
FIG. 10 is a sectional view taken on line E—E of FIG. 9.
Figure 11:
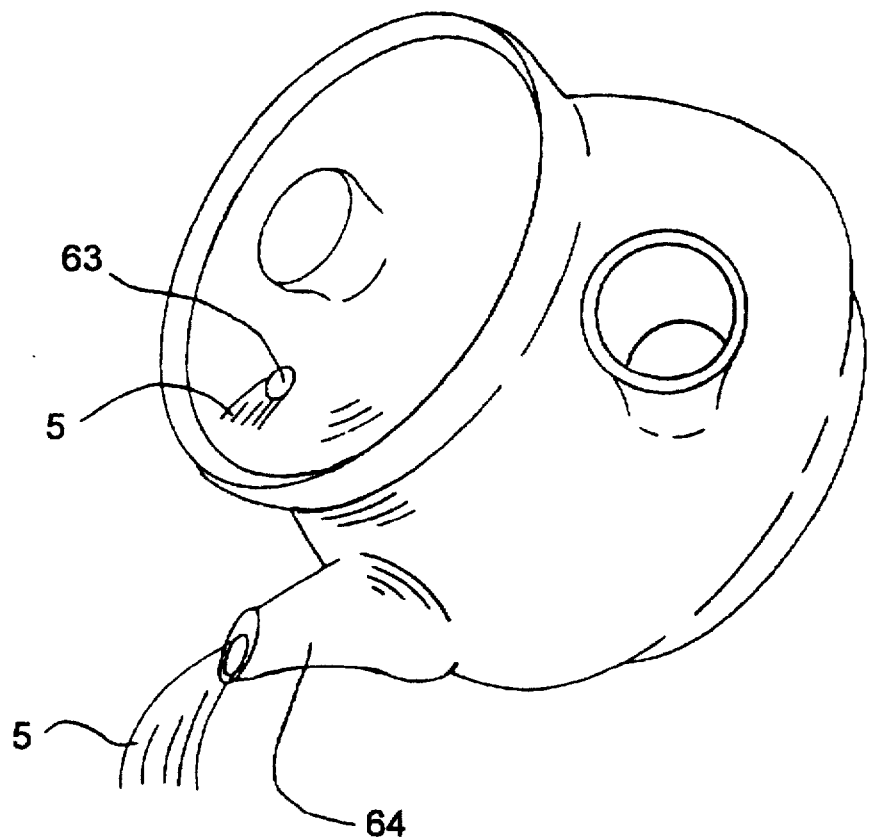
FIG. 11 is a perspective view in explaining the use of the prior art.

As shown in FIG. 7 and FIG. 8, an engaging groove 81 is formed in the middle thickness of lid 8, which is along the periphery of the lid 8. The engaging groove 81 is provided to engage with an inside portion 42 of an O-ring 4.

An engaging groove 92 is formed in the middle height of the inside wall 91 of the top-mouth 9. O-ring 4, which is fit in the lid 9, engages with the engaging groove 92. The depth of the engaging groove 92 is less than the width of the outer portion 41 of the O-ring 4.

Instead of pressing the knob 24 by a thumb, efficient airtightness is obtained by the engagements of O-ring 4 between the lid 8 and top-mouth 9, in this Embodiment 3.

Consequently, the present invention provides the following superior effect:

(1) Tea is prevented from spilling out from the suction port of the lid.

(2) The air is sucked into the teapot body from the suction port, then the hot water in the teapot body is efficiently agitated for brewing and filtering holes are prevented from clogging by tea leaves.

(3) The above effects work more efficiently by the better airtightness of the O-ring.

Industrial Capability

This invention is related to the teapot which is useful to brew green teas, other teas or herbs.

I claim:

1. A teapot comprising:

a teapot body having a mouth at a top thereof;

an outlet on a side wall of said teapot body;

a lid which covers said mouth;

a suction port through an upper surface of said lid; and a vent hole which communicates with and extends from the suction port toward the periphery of said lid to a blow-out port, said blow-out port being positionable toward said outlet, said blow-out port being immersed in water and said suction port being positioned above the water while said teapot is in use, wherein air is drawn through said suction port and blown-out through said blow-out port into said teapot body.

2. A teapot according to claim 1, further comprising:

an O-ring between the periphery of said lid and an inner wall of said mouth of the teapot body.

3. A teapot comprising:

a teapot body having a mouth at a top thereof, an outlet on a side wall thereof and a lid which covers said mouth, wherein a suction port is provided through an upper surface of said lid and a vent hole is provided which communicates with and extends from the suction port toward the periphery of said lid to a blow-out port, said blow-out port being positionable towards said outlet, and wherein air is drawn through said suction port and blown-out through said blow-out port into said teapot body in use, wherein an upper surface of said vent hole is formed so as to incline gradually from said blow-out hole toward said suction port, whereby air blows downward and outward.

4. A teapot according to claim 3, further comprising:

an O-ring between the periphery of said lid and an inner wall of said mouth of the teapot body.

* * * * *